United States Patent

[11] 3,590,915

[72] Inventors Gunter Riedel
Konstanzerstr. 63, Munich 13;
Herbert Prenzlau, Rauschbergweg 3,
Olching, both of, Germany
[21] Appl. No. 816,334
[22] Filed Apr. 15, 1969
[45] Patented July 6, 1971
[32] Priority Mar. 18, 1969
[33] Germany
[31] P 19 13 546.7

[54] HEAT SINK ASSEMBLY FOR ELECTRONIC COMPONENTS
10 Claims, 3 Drawing Figs.

[52] U.S. Cl. .......... 165/80, 165/185, 317/100, 317/234 A
[51] Int. Cl. .......... F28f 7/00, H01l 3/00
[50] Field of Search .......... 165/80, 185, 186; 317/234.1, 100

[56] References Cited

UNITED STATES PATENTS 3,220,471 11/1965 Coe .......... 165/80 X
3,435,891 4/1969 Parrish .......... 165/121

FOREIGN PATENTS 1,110,322 7/1961 Germany .......... 317/234
992,442 5/1965 Great Britain .......... 317/234

*Primary Examiner*—William F. O'Dea
*Attorneys*—Curt M. Avery, Arthur E. Wilfond, Herbert L. Lerner and Daniel J. Tick

ABSTRACT: A heat sink modular assembly for electronic components is composed of a plurality of heat sink structures which all have substantially the same design, a prismatic overall shape with at least one geometrical plane of symmetry. Each individual heat sink of the assembly has a core with cooling vanes protruding therefrom and with means for attaching at least one semicondctor component, each core being traversed by one or more bores. The structures are aligned with, and adjacent to one another and are rigidly held together by at least one tensioning rod passing serially through the bores of the heat sink cores, thus forming a single rigid group in which the longitudinal axes of the respective heat sink structures extend transversely of the rod. At least two pairs of the cooling vanes extend from each core on opposite sides of the core axis in a plane parallel to the tensioning rod and are axially spaced from each other at opposite sides of the tensioning rod. The vanes of these pairs have abutment faces at their respective edges. All of these abutment faces on one side of the axis are situated in a plane perpendicular to the tensioning rod and parallel to the plane of symmetry, and all of the abutment faces on the opposite side of the rod are located in another plane parallel to the plane of symmetry. The entire heat sink structure inclusive of all other vanes is accommodated between the two abutment face planes.

PATENTED JUL 6 1971 3,590,915

HEAT SINK ASSEMBLY FOR ELECTRONIC COMPONENTS

Our invention relates to a modular group assembly of heat sinks for supporting respective electronic components and dissipating the waste heat generated in these components. More particularly the invention concerns a group assembly of heat sink structures which have all substantially the same design of generally prismatic overall shape with at least one geometrical plane of symmetry, each heat sink comprising a massive core and cooling vanes protruding from the core which is also equipped with means for attaching at least one semiconductor component and has a bore traversed by a tensioning bolt or rod which rigidly fastens the individual heat sink structures together to form a single set or group assembly.

In a known assembly of this type the semiconductor components, for example diodes or thyristors, are fastened with the aid of a screwbolt in a matingly threaded bore to the heat sink core; the cores of the heat sink structures are directly adjacent to each other within the group, and the cooling vanes extend in planes perpendicular to the bores traversed by the tensioning bolt or rod.

Such a group assembly of head sink structures virtually is applicable only under the condition that the individual heat sink structures thus joined to a single group or set, are substantially on the same electrical potential. To be sure, the heat sink structures within the group assembly could be insulated from each other by placing insulating partitions between the structures and by also insulating the tensioning rod, for example with the aid of a tube of insulating material which surrounds the rod and insulates it relative to all of the heat sink cores traversed by the rod. This, however, does not make the known assembly suitable for relatively high operating voltages, nor does it afford producing such assemblies by a satisfactorily economical manufacture and with satisfactory small dimensions. This is because a sufficiently long creep-current spacing must be preserved between each two adjacent heat sink structures that have respectively different electrical potentials and are aligned longitudinally of the tensioning rod; and such creep distances are not attainable with the aid of a partition dimensioned for securing sufficient insulation in the known assembly. For sufficient creep-current spacing, therefore, it would be necessary to either provide very thick insulating partitions or to interpose insulating spacers between the individual heat sink structures assembled of the group, but both possibilities increase the manufacturing work and cost, and result in excessively spacious equipment occupying more space than necessary for cooling purposes.

It is an object of our invention to provide a heat sink group assembly of electronic components, generally of the type introductorily mentioned hereinabove, that affords securing a much more compact size of the entire group while permitting the respective heat sink structures thus combined to a unit to be connected to different electrical potentials. More specifically, it is an object of the invention to achieve these results by providing for sufficiently large creep distances with the aid of separating partitions of no more than the normal thickness determined by electrical insulating requirements or mechanical strength, and without the necessity of adding intermediate space or structures.

To achieve these objects, and in accordance with our invention, at least two cooling vanes on axially opposite localities of the bores for the passage of the tensioning rod through the core of each individual heat sink structure of the group assembly are provided with abutment faces, the faces located on one side of the core being situated in an abutment face plane perpendicular to the tensioning rod and parallel to a symmetry plane of the core, and the abutment faces on the opposite side of the core being situated in another plane which is also perpendicular to the tensioning rod and parallel to the symmetry plane. The entire heat sink structure is located in the space between the two abutment face planes.

According to another, preferred feature of the invention, the core of each heat sink structure has the shape of a plate with at least two axes of symmetry extending at a right angle to each other, the means for fastening the electronic component being situated on at least one of the axial end sides of the cores, and the cooling vanes protruding from the two broad sides of the core at an angle of 90° with respect to a symmetry axis. The angle between the cooling vanes and the second symmetry axis is preferably also 90°,but according to the modification the latter angle may also be acute.

In a preferred embodiment of the invention, at least two cooling vanes on each side of the core in each heat sink structure are provided with abutment faces which extend parallel to a first one of two symmetry planes and are equally spaced therefrom, all other vanes of each heat sink structure being situated within the space bounded by the core and by each of the two abutment face planes. In this embodiment, the bore for the tensioning rod, located between those cooling vanes that are provided with the abutment faces, extends perpendicularly to the first symmetry plane. The tensioning of the heat sink structures for rigidly holding them together as a single group is effected with the aid of pressure plates which are seated upon the tensioning rod and extend across the respective abutment faces of at least two cooling vanes.

By virtue of the invention, the semiconductor components fastened to the respective heat sink structures, can be readily interconnected electrically to form a great variety of different electronic circuits, such as rectifier circuits. Such facility of electrical interconnection is due to the fact that the individual heat sink structures can be insulated from each other or, if desired, can be electrically parallel connected simply by omitting an insulating partition, or by employing a metallic partition in lieu of an insulating partition. The partitions provided between the individual heat sink structures of the unit may be employed for accommodating further circuit components for control of, or cooperation with a rectifier or thyristor, for example resistors, induction coils, capacitors, potentiometers, control signal transformers and other components which are to form part of the same circuitry that includes the main component mounted on the core of the heat sink structure or is to coact therewith. For mounting the partitions and consequently also for mounting the just-mentioned additional circuit component, no particular connecting elements between the heat sink structures and the partitions are required; the partitions rather are merely stuck upon the tensioning bolt or rod used for securing the heat sink structures together so that the partitions are held in position by the frictional forces and pressure produced by the tensioning means.

The invention will be further described with reference to an embodiment illustrated by way of example in the accompanying drawing which relates to a group assembly with six heat sink structures equipped with six thyristors which are electrically interconnected to form a three-phase bridge network, and wherein.

Each of the six heat sink structures 1 of the group assembly are substantially identical in design and size. Each has generally a prismatic overall shape and two planes of symmetry denoted by A and B which define a right angle with each other, the location of these symmetry planes being particularly apparent from FIG. 3. The first symmetry plane, denoted by A, extends in the longitudinal direction of a generally plate-shaped and slightly tapering or pyramidical core 11 which has cooling vanes 12, 121, 122, 123, 124 protruding from the two broad sides. The core and the cooling vanes consist of good heat-conducting metals such as copper. The vanes extend perpendicularly to the first symmetry plane A and are also perpendicular to the second symmetry plane B.

Figure 2:
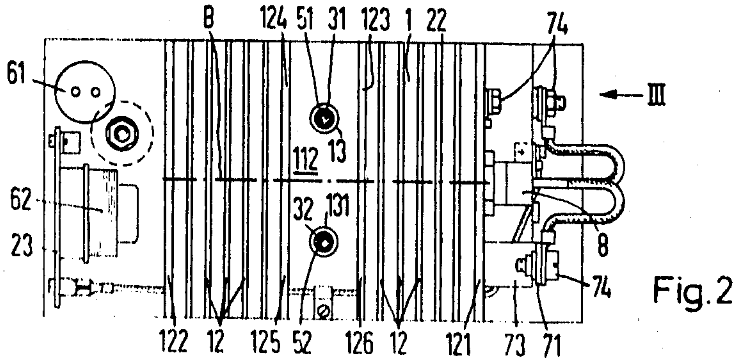
FIG. 2 is a lateral view, taken along the lines II–II of FIG. 1.

For some purposes, however, it is advisable to have the vane faces extend at an acute angle to the second symmetry plane B so that, relative to FIG. 2, the vanes will slant in the downward direction. The two outermost cooling vanes 121, 122 and two further vanes 123, 124 are thicker than the other vanes. The vanes 123 and 124 protrude slightly beyond all other vanes and are provided with abutment faces 125, 126 which extend parallel to the first symmetry plane A and are equally spaced therefrom. The core 11 has two bores 13 and 131 (FIG. 2) located between the vanes 123 and 124 and extending perpendicularly to the first symmetry plane A.

A thyristor 8 is fastened on the axial end face 111 of each core 11. For this purpose, the end face 111 may be provided with a threaded bore and the thyristor 8 may have a threaded stud engageable with the bore thread.

The six heat sink structures 1 with the respective thyristors 8 fastened thereto, are mounted on two tensioning rods 31 and 32. Respective partitions 22, such as plates or sheets, are inserted between each two adjacent structures 1, and the rods are insulated from the structures by insulating tubes 51 and 52 coaxially placed upon the rods. The two outermost heat sink structures are insulated from the tensioning rods by means of wall plates 21. All of the partitioning and wall plates 22 and 21 are provided with bores corresponding to those of the heat sink structures and traversed by the tensioning rods.

The structures 1 with the partitioning and wall plates 22, 21 are clamped together on the rods 31 and 32 with the aid of two pressure plates 41 and 42. The pressure plates extend across the abutment faces 125 and 126 of at least two of the thicker cooling vanes and are sufficiently strong to secure a rigid group assembly. When tightening the clamping nuts, such as the one denoted by 311, the tensioning forces are transmitted through the relatively thick cooling vanes that are provided with the abutment faces, so that the path of the clamping force extends between the wall plates 21 from heat sink structure to structure through the intermediate partitions 22.

Figure 1:
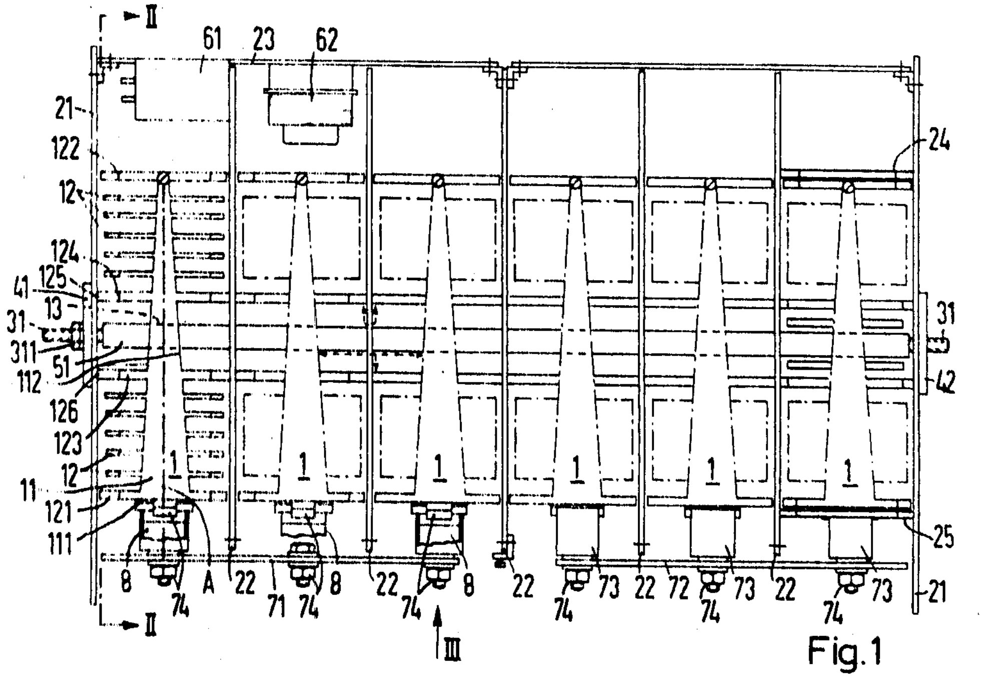
FIG. 1 is a plan view of an embodiment of the heat sink group assembly of the invention.

Terminal bolts and bus bars 71, 72 are connected with the heat sink structures 1 at the end faces 111. Some of these connections are metallically conducting and some of them include insulating spacers 73. These terminals and bus bars serve to interconnect the thyristors to the three-phase bridge network. For example, the three heat sink structures at the left of FIG. 1 are thus directly connected to the three-phase voltages and therefore must be insulated from each other. This can be done with the aid of wall plates or partitions of insulating material having but a few millimeters thickness, because by virtue of the invention the creep-current distances, shown by a broken line between the second and third structure 1, are very large.

The partitioning and wall plates 21 and 22 protrude on all sides over the prismatic heat sink structures 1. As a result, there is obtained a space behind each of the rearmost cooling vane 122, which space is eminently suitable for accommodating additional circuit components such as capacitors 61 that form part of the rectifier or thyristor circuitry, or pulse transformers 62. These additional components may also be mounted on the wall plate 23 secured to the above-mentioned partitioning or wall plates 21, 22.

The embodiment described above with reference to the drawing is particularly well suitable for self-ventilation. If forced ventilation by means of a blower is needed, it is preferable to supplement the described group assembly in such a manner that the heat sink structures are surrounded by walls which form a cooling channel and have all the same height so that several group assemblies directly placed on top of each other, form a composite cooling channel, which, even without the provision of additional inserts for sealing purposes, has no practically appreciable lateral openings. Such an embodiment is illustrated in the drawing with reference to the outermost right heat sink structure As shown, an auxiliary plate 24, 25 of insulating material is fastened on the outermost cooling vanes. As is best apparent from FIG. 2, the height of the auxiliary plates corresponds to the height of the outermost wall plates 21. The auxiliary plates 24 and 25 are provided with abutment faces. The cooling vanes of the heat sink structure are preferably all given the same design and slightly smaller width than that of the auxiliary plates 24 and 25. For that reason, a somewhat larger plate 43 (FIG. 1) is needed for properly clamping the heat sink structure together. The auxiliary plates 24 and 25 may also serve as carriers of additional circuit components.

Figure 3:
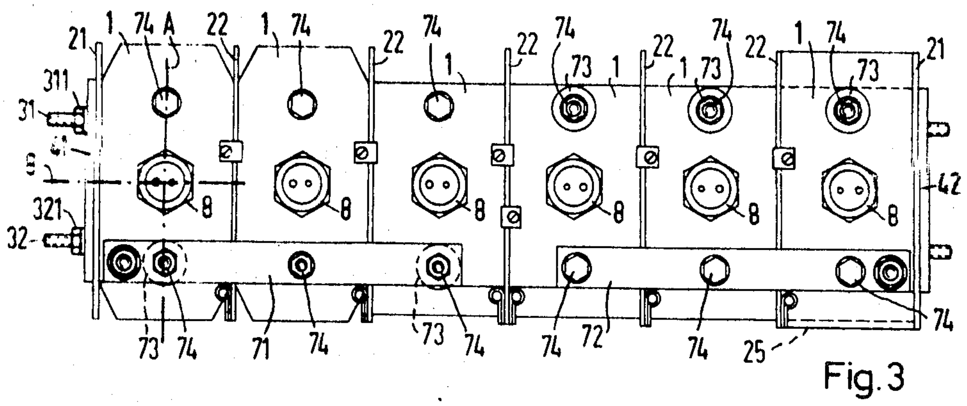
FIG. 3 is a front view of the group assembly seen in the direction of the arrow III of FIGS. 1 and 2.

The two heat sink structures, shown at the outermost left in FIG. 3, are further given a somewhat different design of the cooling vanes as compared with the four other structures. This difference resides in the fact that the vanes in the two left-hand units have a contour 80 so shaped that these vanes, as seen in FIG. 3, have the same height as the partitioning and wall plates 21, 22. To make this possible without disadvantage, the corners of the cooling vanes are provided, for example by the illustrated bevelling, with a shape which is such that the creep distance from the vane of one heat sink structure to the horizontally adjacent vane of the next hat sink structure is larger than the thickness of the intermediate partitioning plate 22 of insulating material. Such a configuration of the cooling vanes is particularly applicable to those vanes that are provided with the abutment faces.

It should be understood that it is generally preferable to give all of the individual heat sink structures of the group assembly the same design, namely either that of the third to sixth structures, counted from the left of FIG. 3, or the design of the first and second structures, although the invention also permits using heat sink structures which are identical with respect to the main elements apparent from the drawing but differ from each other in subsidiary features such as exemplified by the above-described item 80 in FIG. 3.

Upon a study of this disclosure, it will be obvious to those skilled in the art that our invention permits of various other modifications and hence may be given embodiments other than particularly illustrated and described herein, without departing from the essential features of our invention and within the scope of the claims annexed hereto.

We claim:

1. A heat sink group assembly for electronic components, comprising a plurality of heat sink structures all having substantially the same design of substantially square prismatic shape with at least one geometrical plane of symmetry and each having a substantially plate-shaped core and cooling vanes protruding from the core, said core having means for attaching at least one semiconductor component to a surface thereof and having a bore, said heat sink structures being aligned with and adjacent to one another, fastening means having at least one insulated tensioning rod extending serially through said bores of said respective cores and joining said structures together to form the group with said prismatic structures having their respective longitudinal axes transverse to said rod, said bore of each core being located between two of said cooling vanes located in axially spaced relation to each other, said two vanes forming abutment faces at respective edges on opposite sides of the core axis, the abutment faces located at each of said sides being situated in an abutment face plane perpendicular to said tensioning rod and parallel to a plane of symmetry, and the entire heat sink structure inclusive of all of said vanes being located between said two abutment face planes, said heat sink structures extending transverse to the axis of said rod, said cooling vanes extending substantially parallel to the axis of said rod, and partitions axially spaced from each other along the rod and having bores traversed by said rod, said partitions being located on opposite sides of each of the heat sink structures and extending beyond at least one edge of each heat sink structure, said two vanes of each of said heat sink structures engaging at their edges each of the corresponding partitions of the heat sink structure.

2. An assembly according to claim 1, wherein at least two pairs of said cooling vanes are provided with said abutment faces, said two vane pairs extending from said core in each structure on opposite sides of said axis in a plane parallel to said tensioning rod and being axially spaced from each other at opposite sides of said bore and tensioning rod, said partitions extend beyond said two vanes of each of said heat sink structures which engage said partitions, and further comprising two pressure plates seated on the tensioning rod on opposite sides of the group of heat sink structures for clamping said structures to each other.

3. An assembly according to claim 1, further comprising two pressure plates seated on the tensioning rod on opposite sides of the group of heat sink structures for clamping said structures to one another and wherein each of said pressure plates extends across the respective abutment faces of one of said abutment face planes.

4. An assembly according to claim 1, wherein at least two pairs of said cooling vanes are provided with said abutment faces, said two vane pairs extending from said core in each structure on opposite sides of said axis in a plane parallel to said tensioning rod and being axially spaced from each other at opposite sides of said bore and tensioning rod, said core of said heat sink structure having a rectangular cross section and being elongated in symmetry to a first one of said symmetry planes, said core having a second symmetry plane at a right angle to said first symmetry plane, said attaching means being situated on at least one of the end faces of said core, said vanes protruding from the two broad sides of said core at a right angle to said first symmetry plane, said abutment faces extending parallel to said first plane of symmetry at respective equal distances therefrom, all others of said cooling vanes being situated within the space between said core and said abutment face planes, said bore extending perpendicular to said first symmetry plane, and said fastening means comprising two pressure plates resting against the two outermost ones of said heat sink structures of said group, each of said pressure plates being seated on said tensioning rod and extending across the respective abutment faces in one of said abutment face planes.

5. An assembly according to claim 4, wherein said cooling vanes extend perpendicularly to both said first and second planes of symmetry.

6. An assembly according to claim 1, wherein each of said heat sink structures has a second symmetry plane perpendicular to said one symmetry plane, each of said partitions protruding beyond said prismatic heat sink structure and having edges parallel to said heat sink edges and spaced from said second plane of symmetry a larger distance than said heat sink edges, and further comprising auxiliary plates affixed to said two vanes of each of said heat sink structures at both ends of each of said cores and extending transversely to the axis of the rod, said auxiliary plates forming together with said partitions a channel of substantially rectangular cross section around at least one of said heat sink structures.

7. An assembly according to claim 6, wherein said auxiliary plates and said partitions comprise insulating material and said auxiliary plates have opposite marginal portions extending beyond the edges of said vanes, said auxiliary plates having abutment faces located in one of said abutment face planes.

8. An assembly according to claim 6, further comprising circuit components fastened to the protruding portion of the partitions and to the auxiliary plates.

9. An assembly according to claim 8, wherein said circuit components are mounted in the spaces between the protruding portions of said partitions which extend beyond the cooling vanes.

10. An assembly according to claim 4, wherein said core has pyramidal shape so as to have at one axial end a larger rectangular cross section than at the other end, said vanes being integral with said core and having all the same rectangular outer contour, said bore and said two vane pairs being situated generally near the middle of the core length, the other vanes being axially spaced from each other between said vane pairs and the two axial ends respectively of said core, said means for attaching at least one semiconductor device being situated at said one end of larger cross section.

F-4127

PO-1050
(5/69)

UNITED STATES PATENT OFFICE
CERTIFICATE OF CORRECTION

Patent No. 3,590,915 Dated July 6, 1971

Inventor(s) Günter Riedel and Herbert Prenzlau

It is certified that error appears in the above-identified patent and that said Letters Patent are hereby corrected as shown below:

The street address of the second inventor should read --Rauschbergweg 2--

Signed and sealed this 7th day of March 1972.

(SEAL)
Attest:

EDWARD M.FLETCHER,JR.
Attesting Officer

ROBERT GOTTSCHALK
Commissioner of Patents